United States Patent
Yu et al.

(10) Patent No.: US 7,215,649 B2
(45) Date of Patent: May 8, 2007

(54) METHOD AND SYSTEM FOR WIRELESS PAIRING

(75) Inventors: Robert Yu, Taipei (TW); Vance Yeh, Taipei (TW)

(73) Assignee: Via Technologies, Inc., Taipei (TW)

( * ) Notice: Subject to any disclaimer, the term of this patent is extended or adjusted under 35 U.S.C. 154(b) by 552 days.

(21) Appl. No.: 10/865,530

(22) Filed: Jun. 10, 2004

(65) Prior Publication Data

US 2005/0152294 A1 Jul. 14, 2005

(30) Foreign Application Priority Data

Jan. 8, 2004 (TW) .............................. 93100419 A

(51) Int. Cl.
*H04Q 7/00* (2006.01)

(52) U.S. Cl. .................. 370/313; 370/310; 370/257; 370/402; 455/41.2; 455/414; 455/445; 455/456

(58) Field of Classification Search ................ 370/313, 370/310, 257, 402; 455/41.2, 414, 445, 456, 455/457
See application file for complete search history.

(56) References Cited

U.S. PATENT DOCUMENTS

| | | | |
|---|---|---|---|
| 6,456,857 B1* | 9/2002 | Bos et al. ................. | 455/550.1 |
| 6,549,768 B1* | 4/2003 | Fraccaroli ................. | 455/456.3 |
| 6,778,824 B2* | 8/2004 | Wonak et al. ........... | 455/426.2 |
| 7,054,296 B1* | 5/2006 | Sorrells et al. .............. | 370/338 |
| 7,146,191 B2* | 12/2006 | Kerner et al. ................ | 455/558 |
| 2004/0062262 A1* | 4/2004 | Venteicher et al. ......... | 370/431 |
| 2004/0253923 A1* | 12/2004 | Braley et al. ............... | 455/41.2 |
| 2005/0109841 A1* | 5/2005 | Ryan et al. .................. | 235/380 |
| 2005/0152294 A1* | 7/2005 | Yu et al. ..................... | 370/310 |
| 2006/0068760 A1* | 3/2006 | Hameed et al. .......... | 455/412.1 |
| 2006/0094461 A1* | 5/2006 | Hameed et al. .......... | 455/552.1 |
| 2006/0250980 A1* | 11/2006 | Pereira et al. .............. | 370/254 |
| 2007/0032195 A1* | 2/2007 | Kurisko et al. ............ | 455/41.2 |

* cited by examiner

*Primary Examiner*—Matthew Anderson
*Assistant Examiner*—Minh Dao
(74) *Attorney, Agent, or Firm*—Thomas, Kayden, Horstemeyer & Risley

(57) ABSTRACT

A method and system for wireless pairing procedure through a wired interface. The wireless pairing system of the present invention comprises at least two wireless devices and a central controller. First, the wireless devices are connected to the central controller through a wired interface for pairing. The central controller then requests relevant information such as device address, device type, and connection mode of each wireless device. The central controller determines all possible pairs of peer entities according to the relevant information of the wireless devices, and generates a dedicated link key for each pair for successful pairing. Finally, the central controller writes the link key and the relevant information of the corresponding peer entity into each wireless device.

22 Claims, 2 Drawing Sheets

METHOD AND SYSTEM FOR WIRELESS PAIRING

BACKGROUND OF THE INVENTION

1. Field of the Invention

The present invention relates to a pairing procedure for wireless communication technique, and more specifically, to a method and system thereof for wireless pairing procedure through a wired interface.

2. Description of the Related Art

Wireless communication, such as blue teeth, between devices such as desktops, notebooks, Personal Digital Assistants (PDA), mobile phones, printers, scanners, digital cameras, and various home electronic appliances is often achieved by short range radio technology. Each wireless device is assigned a unique standard address, in order to establish peer-to-peer, or-peer-to-many low-power wireless connections for a local network. Transmitted data is encrypted and encoded by security procedures before transmission. The security procedure comprises:

1. PIN (Personal Identification Number) code comparison;
2. link key pairing;
3. authentication;
4. encryption key generation (optional);
5. initiating encryption (optional).

FIG. 1 shows a conventional wireless pairing procedure for short range radio communication. One of two unpaired wireless devices first searches for another device wirelessly, and then establishes a wireless connection when one is located. Once the two wireless devices establish a wireless connection, a wireless pairing procedure is performed according to the following procedures. First, both the two wireless devices must enter an identical PIN code for identification, if identification is successful, a dedicated Link Key is generated for the two wireless devices. The dedicated link key is required in the subsequent security procedure for generating an Encryption Key. Link key is not only for encryption key generation, but also for authentication. Furthermore, encryption is not part of authentication, but they are all part of the security procedure.

The conventional short range radio communication requires both wireless devices to enter PIN code during a wireless pairing procedure in order to obtain a dedicated Link key for successful pairing. Certain wireless devices, however, are too small in size, or do not have an alphanumeric input interface (such as a wireless mouse or a wireless printer), thus either an added input interface required for supporting enter PIN code during a pairing procedure will cause additional cost, or the wireless devices cannot obtain a Link Key during the wireless pairing procedure and the Encryption Key cannot be generated. Otherwise, suffer lower security level using fixed PIN code.

Furthermore, errors and problems may occur during the wireless pairing procedure when several similar wireless devices using short range radio communication are located in the same region. For example, a nearby wireless keyboard may be mistakenly located by a wireless dongle and erroneously recognized as the desired device for pairing.

SUMMARY OF THE INVENTION

Accordingly, the present invention provides a wireless pairing method for obtaining relevant information about the peer entity without requiring the standard wireless pairing procedure.

The present invention also provides a method of exchanging a Link Key through wired interface between at least two wireless devices, enabling the wireless devices that are not capable of inputting numbers or letters to perform wireless pairing, authentication, and encryption procedures.

The present invention further provides a wireless pairing method and system thereof using a wired interface. The system of the present invention for performing wireless pairing comprises at least two wireless devices that connected to a central controller via wired interface. When the wireless devices are connected to the central controller, the central controller detects the wireless devices and reads relevant information of each wireless device. The relevant information comprises device address, device type, connection mode, and other additional information. Subsequently, the central controller determines all possible pairs of peer entities for wireless pairing according to the device type and the connection mode of the wireless devices, and generates a dedicated link key for each pair. Finally, the central controller writes the device address, device type, connection mode, and dedicated link key of the corresponding peer entity into each wireless device individually.

The wired interface between the wireless devices and the central controller of the present invention is a wired secure channel which transmits and receives commands and responses. The wired secure channel can be implemented by a serial port interface (RS-232 Port), or an Inter IC Bus ($I^2C$ Bus) that accesses and controls memory directly. The system does not require additional software to support receiving commands and sending responses if the $I^2C$ Bus is used.

The central controller of the present invention can be an independent operating system, a passive operating device controlled by a mainframe, or a device integrated in any of the wireless devices. The central controller detects the connection status of each wireless device by implementing contact sensor to detect the wireless devices or by performing periodic inquiries or receiving an interrupt message through the wired interface when wireless devices are connected to the central controller.

The central controller of the present invention can adjust the rule for wireless pairing according to various applications. Each of the wireless devices of the present invention comprises an Application Program Interface (API) that supports reading and writing relevant information of the wireless device, such as device address, device type, connection mode, and other additional information. API provides the relevant information of peer entities to the upper layer application and stores the relevant information in a recognized device database of the upper layer application. The wireless devices are disconnected from the central controller after completing the pairing procedure. Authentication is then performed using the assigned Link key to generate an encryption key for use of data encryption during transmission.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1:
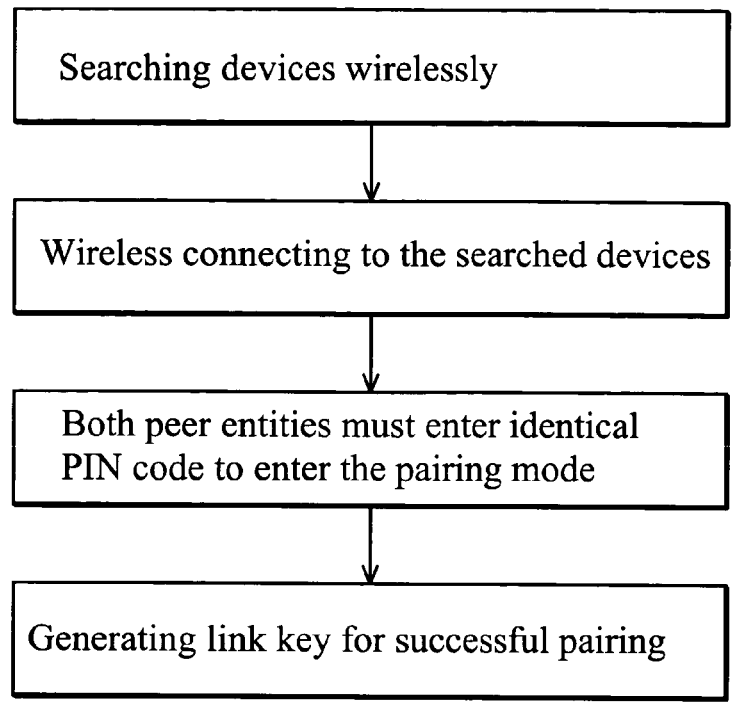
FIG. 1 is a flowchart showing the conventional wireless pairing procedure.
Figure 2:
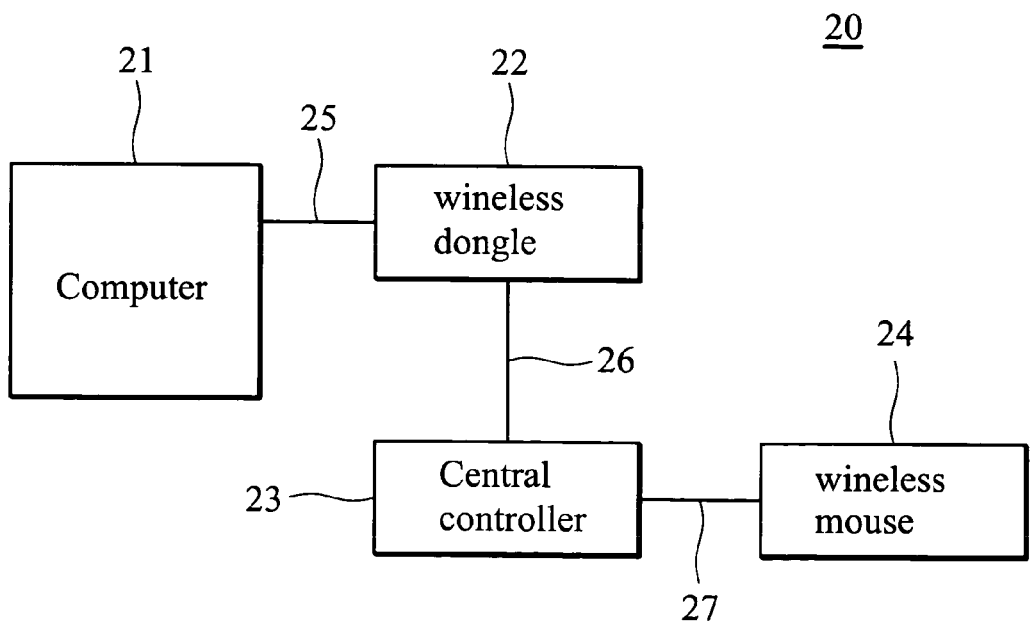
FIG. 2 illustrates a wired interface for a short range radio pairing system according to the present invention.

FIG. 2 illustrates the wireless pairing system 20 using a wired interface according to the embodiment of the present invention. FIG. 2 shows a wireless mouse 24 pairing with a wireless dongle 22. The wireless dongle 22 is connected to a computer 21 through a link 25, such as a universal serial bus (USB), a serial port, for example, an RS-232 port, or an interface supported by the wireless dongle 22, such as PCMCIA (Personal Computer Memory Card International Association). The central controller 23 can be installed in the wireless devices, charger, or computer, whereas the central controller 23 in FIG. 2 is an independent operating system. The central controller 23 in the embodiment is connected to the wireless dongle 22 and the wireless mouse 24 via an Inter IC Bus ($I^2C$ Bus) 26 and 27 respectively. The $I^2C$ Bus accesses and controls memory directly and does not require extra software and short range radio protocol stack receive commands and transmit responses during the wireless pairing and authentication procedures. The conventional wireless pairing and authentication procedures must be performed with a complete wireless protocol, whereas the present embodiment enables the pairing procedure for exchanging a link key, as well as the authentication procedure to proceed before the computer starts completely.

The central controller 23 first detects the wireless dongle 22 and wireless mouse 24, then reads the wireless device address, device type, connection mode, and other additional information from the two wireless devices 22 and 24. The central controller 23 determines whether the detected devices 22 and 24 can form a peer entity according to the device type and connection mode thereof. In the present embodiment the wireless dongle 22 and the wireless mouse 24 are capable of connecting and cooperating with each other, and the central controller 23 thus generates a dedicated link key for devices 22 and 24. The link key, as well as the information of device address, device type, connection mode of the wireless dongle 22 are written in the memory of the wireless mouse 24 through the $I^2C$ bus 27, and similarly, the link key and the information of device address, device type, connection mode of the wireless mouse 24 are written in the memory of the wireless dongle 22 through the $I^2C$ bus 26. The two wireless devices 22 and 24 obtain the relevant information of the peer entity for wireless pairing by connecting the central controller 23 via the links 26 and 27. The central controller 23 can disconnect the link 26 and 27 with the wireless dongle 22 and wireless mouse 24 after the central controller 23 provides the Link key. The two devices 22 and 24 then perform authentication using the link key and moreover generate an encryption key, and encrypt the messages for transmission.

Figure 3:
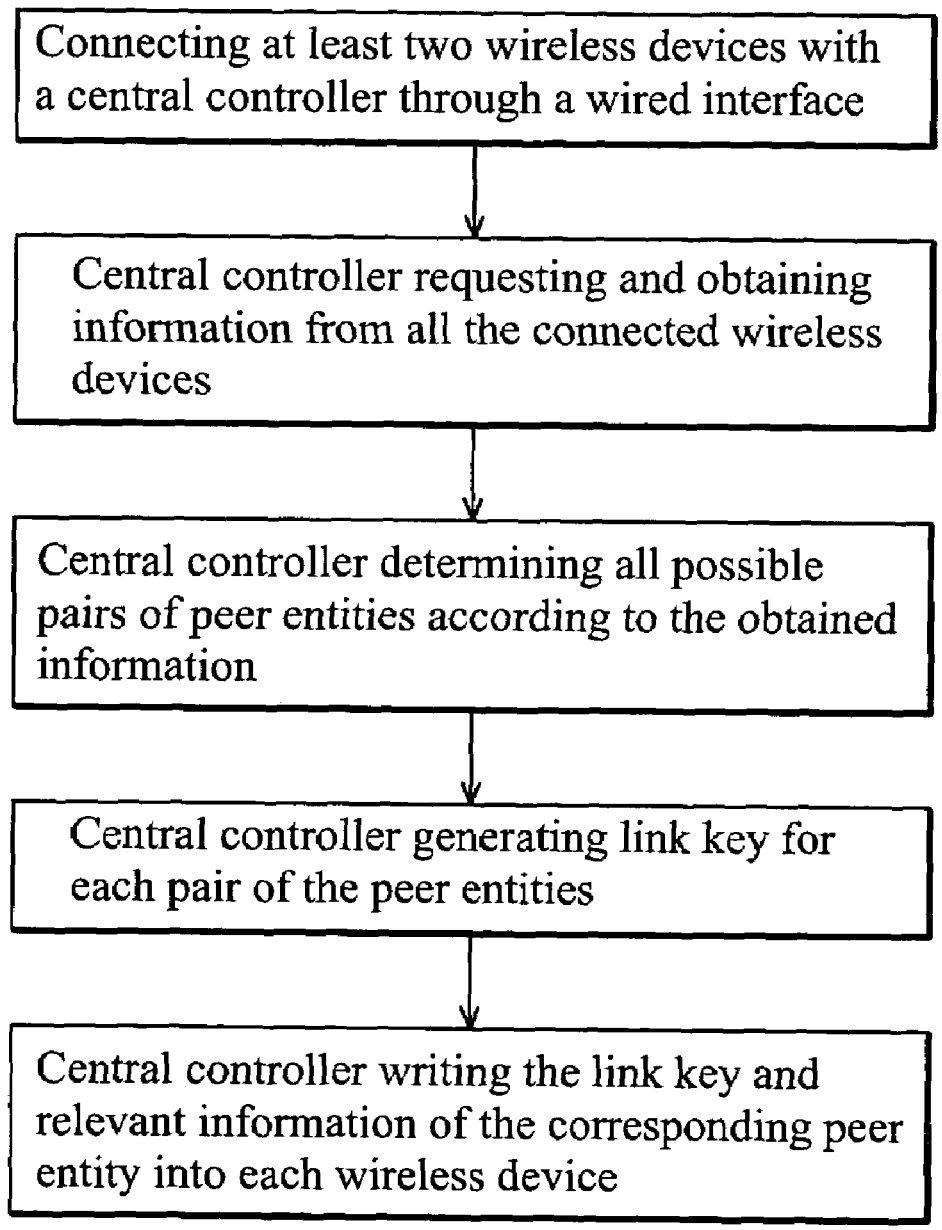
FIG. 3 is a flowchart showing the wireless pairing procedure using a wired interface according to the present invention.

The wireless pairing procedure of the present invention is also illustrated by the flowchart shown in FIG. 3. First, at least two wireless devices are wired connected to a central controller, wherein the connection must be capable of transmitting and receiving commands and responses, for example, the connection can be a serial port interface (RS-232 port), or Inter IC Bus ($I^2C$ Bus) which access and control memory directly. The central controller utilizes a contact sensor to detect the connection status of the wireless devices, or the wired connection to detect the connection status of the wireless devices by performing periodic inquiries or receiving interrupt messages. The central controller is responsible for detecting the wireless devices which are connected to the central controller and reading the device address, device type, connection mode, and other additional information of the detected wireless devices.

In an embodiment of the present invention, the wireless devices operate according to the Bluetooth specification. However, the Bluetooth protocol is just a possible alternative for the wireless devices of the present inventions. A short range radio communication device address is generated according to the OUI assignment principle regulated by the Institute of Electrical & Electronics Engineers (IEEE), and each wireless device has a dedicated 6 byte (48 bits) address for identification. The device type defines the class of each wireless device, such as keyboard, mouse, mobile phone, printer, scanner, digital camera, and electronic appliances. The connection mode defines the type of service, for example, a wireless headset is classified as HSP HS slave, a wireless keyboard is classified as HID Device slave, and a wireless dongle can be either HSP AG master, HSP HS slave, or HID Host master. The central controller determines all the possible pairs according to the connection mode of the wireless devices, like wireless dongle can be paired with wireless headset (HSP AG (master) with HSP HS [slave]), and wireless dongle can be paired with wireless keyboard (HID Host [master] and/or with HID Device [slave]). Wireless headset and wireless keyboard will not be determined as a pair as the connection mode of the both wireless devices are slave and also because they are not the same profile.

The central controller determines all possible pairs according to device type and the connection mode after reading the relevant information of the connected wireless devices. The rules for pairing are adjustable depending on various applications. The central controller generates a unique Link key for each pair of peer entities, wherein the link key is a 128 bit key. Then the central controller writes the link key and the information of device address, device type, and connection mode of the corresponding peer entity into the memory of each wireless device.

The hardware for implementing the present embodiment must provide an interface for wired connection, and the connection must be capable of transmitting commands and sending responses or accessing memory directly. The wireless devices for implementing the present embodiment must comprise an Application Program Interface (API) for providing relevant information (such as device address, device type, connection mode, other additional information and link key) to an upper layer application. The conventional API only supports reading and writing of device address and link key, whereas the present embodiments allows transmitting Vendor Specific HCI Command and Events through the Host Controller Interface (HCI) of the short range radio communication protocol. If the wireless device does not have the HCI interface, other interfaces can also be used for setting the API. The upper layer application reads the device address and link key through the original API, and reads the rest of the information (such as device type, connection mode, and other additional information) through the new API defined by user. These API store the information in a recognized device database of the upper layer application, for example, Widcomm BTW generates pairing shortcuts in its Bluetooth Space after storing the wireless device information, and the wireless connection between devices can be established by simply clicking the particular shortcut. Then the wireless devices obtain the link key provided by the central controller, the subsequent procedures such as authentication and encryption are identical to the conventional wireless procedures.

The wireless pairing method and system of the present invention performs pairing procedures by a wired interface, which allows wireless devices to obtain information (such as device address, device type, connection mode and the link key) of the corresponding peer entities without requiring a standard pairing procedure. Also the wireless devices which do not have an alphanumeric input interface can obtain link key supporting authentication and encryption afterwards by a wired interface. When many similar devices are located in the same region, the present invention also prevents unwanted device connection. The present invention also reduces the time required for locating and selecting peer entities by obtaining extra information such as device type and connection mode through the wired interface.

Finally, while the invention has been described by way of example and in terms of the above, it is to be understood that the invention is not limited to the disclosed embodiment. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A wireless pairing method using a wired interface, comprising the following steps:
   a central controller detecting at least two wireless devices through a wired interface, and reading relevant information of each wireless device, wherein the relevant information comprises device address, device type, connection mode, and other additional information;
   determining possible pairs of peer entities for wireless pairing according to the device type and the connection mode of the wireless devices;
   generating a dedicated link key for each pair of peer entities; and
   writing the device address, device type, connection mode, and dedicated link key of the corresponding peer entity into each wireless device.

2. The wireless pairing method according to claim 1, wherein the wireless devices and the central controller communicate via a wired secure channel for transmitting and receiving commands and responses.

3. The wireless pairing method according to claim 2, wherein the wired secure channel is a serial port interface (RS-232 Port) or an Inter IC Bus ($I^2C$ Bus) that accesses and controls memory directly.

4. The wireless pairing method according to claim 1, wherein the operation of the central controller is chosen from the group consisting of the following: the central controller is operated by an independent operating system, a passive operating device controlled by a mainframe, a device integrated in one of the wireless devices, or combinations thereof.

5. The wireless pairing method according to claim 1, wherein the central controller detects the wireless devices using a contact sensor when the wireless devices are connected to the central controller.

6. The wireless pairing method according to claim 1, wherein the central controller detects the connection status of each wireless device comprising performing periodic inquiries and receiving an interruption message through the wired interface, whenever the wireless devices are connected to the central controller.

7. The wireless pairing method according to claim 1, wherein the rule for determining pairs of peer entities is adjustable according to various applications.

8. The wireless pairing method according to claim 1, wherein each wireless device comprises an application program interface (API) supporting reading and writing of device address, device type, connection mode, and other additional information.

9. The wireless pairing method according to claim 8, further comprising providing the relevant information of the peer entity to an upper layer application and storing the relevant information in a recognized device database of the upper layer application using the API.

10. The wireless pairing method according to claim 1, further comprising performing authentication and encryption using the link key.

11. The wireless pairing method according to claim 1, wherein the central controller and the wireless devices operate according to the Bluetooth protocol.

12. A system for wireless pairing through a wired interface, comprising:
   a wired secure channel, connecting at least two wireless devices; and
   a central controller, connecting to the wireless devices through the wired secure channel to obtain relevant information of each wireless device, wherein the relevant information comprises device address, device type, connection mode, and other additional information, determining possible pairs of peer entities for wireless pairing according to the relevant information and generating a dedicated link key for each pair of peer entities;
   wherein the central controller writes the device address, device type, connection mode, and dedicated link key of the corresponding peer entity into each wireless device individually after successful pairing.

13. The system according to claim 12, wherein the wired secure channel transmits and receives commands and responses.

14. The system according to claim 12, wherein the wired secure channel is a serial port interface (RS-232 Port) or an Inter IC Bus ($I^2C$ Bus) that accesses and controls memory directly.

15. The system according to claim 12, wherein the central controller is operated by an independent operating system, a passive operating device controlled by a mainframe, or a device integrated in one of the wireless devices.

16. The system according to claim 12, wherein the central controller detects the wireless devices using a contact sensor when the wireless devices are wired connected to the central controller.

17. The system according to claim 12, wherein the central controller detects the connection status of each wireless device by performing periodic inquiries or receiving an interrupt message through the wired interface when the wireless devices are connected to the central controller.

18. The system according to claim 12, wherein the rule for determining pairs of peer entities is adjustable according to various applications.

19. The system according to claim 12, wherein each of the wireless devices comprises an application program interface (API) supporting reading and writing of the relevant wireless device information, and the relevant information comprises the device address, device type, connection mode, and other additional information.

20. The system according to claim 19, wherein the wireless device provides the relevant information of the peer entity to an upper layer application and stores the relevant information in a recognized device database of the upper layer application using the API.

21. The system according to claim 12, wherein the dedicated link key is used for authentication and encryption.

22. The system according to claim 12, wherein the central controller and the wireless devices operation conforms to the Bluetooth protocol.

* * * * *